United States Patent [19]

Ueno

[11] Patent Number: 4,747,359
[45] Date of Patent: May 31, 1988

[54] APPARATUS FOR CONTROLLING THE TURN OF SHIP

[75] Inventor: Tetsuo Ueno, Yokohama, Japan

[73] Assignee: Tokyo Keiki Co., Ltd., Ota, Japan

[21] Appl. No.: 899,718

[22] Filed: Aug. 25, 1986

[30] Foreign Application Priority Data

Aug. 29, 1985 [JP] Japan ................................. 60-190298

[51] Int. Cl.$^4$ ............................................ B63H 25/04
[52] U.S. Cl. ........................... 114/144 B; 114/144 A; 114/151; 440/1; 318/588; 364/157
[58] Field of Search ........ 114/144 R, 144 RE, 144 A, 114/144 B, 144 C, 144 E, 146, 150, 151; 440/1, 2, 50; 318/588, 560; 364/154, 155, 157, 174

[56] References Cited

U.S. PATENT DOCUMENTS

| | | | |
|---|---|---|---|
| 3,895,598 | 7/1975 | Blickle | 440/50 |
| 3,917,929 | 11/1975 | Reinhart | 114/144 B |
| 3,951,097 | 4/1976 | Clark | 114/151 |
| 3,967,573 | 7/1976 | Charles | 440/50 |
| 3,987,744 | 10/1976 | Blumberg | 114/144 B |
| 4,034,696 | 7/1977 | Viureth | 114/144 B |
| 4,056,073 | 11/1977 | Dashew | 114/151 |
| 4,205,379 | 5/1980 | Fox | 114/144 B |
| 4,301,760 | 11/1981 | Cassone | 114/144 B |

Primary Examiner—Joseph F. Peters, Jr.
Assistant Examiner—Clifford T. Bartz
Attorney, Agent, or Firm—Wenderoth, Lind & Ponack

[57] ABSTRACT

When the right turn or left turn is set by operating one joystick lever, the bow thrustor arranged on the bow side generates the drift thrust in the rightward or leftward direction in accordance with the turning angular velocity on the basis of the operation of the joystick lever. At the same time, the propellers provided on the stern side are controlled so as to generate the backward thrust proportional to the absolute value of the turning angular velocity of the ship. The forward thrust of the ship which is caused due to the generation of the drift thrust by the bow thrustor is suppressed. Thus, the ship is turned to the right or left around the stern as a rotational center at a predetermined speed with the position of the hull held.

6 Claims, 6 Drawing Sheets

FIG. I
PRIOR ART

APPARATUS FOR CONTROLLING THE TURN OF SHIP

BACKGROUND OF THE INVENTION

The present invention relates to an apparatus for controlling the turn of a ship which is used to steer a working ship having a plurality of propelling equipment such as an anchor handling tag supply vessel and, more particularly, to an apparatus for controlling the turn of a ship in which the ship can be turned around a stern as a rotational center with the position of the hull held.

Hitherto, in working ships which are used in material handling to the oil digging rig which is known as an anchor handling tag supply vessel, for example, as shown in FIG. 1, two rudders 2L and 2R, two variable pitch propellers 4L and 4R, and a bow thrustor 6 to obtain the thrust in the leftward or rightward direction of the bow are equipped, and these five thrust equipment are individually controlled by independent levers.

The works which are required for such working ships include: the supply of material to the rig in the state which is close to the oil digging rig; the loading and unloading of material by the crane of the rig; the anchor handling for moving and mooring the rig; and the like. In these works, it is required to delicately steer the ship at a slow speed in the disturbance such as wind, tidal current, and the like. Practically speaking, the ship steering operations in this case include the turn, lateral movement, inclined sailing, holding of the specific point at sea, holding of the bow azimuth, and the like at the same position.

For those severe requirements, the ship operator must continue the works for a long time while adjusting the respective control levers in accordance with the situation in consideration of the performances of the five thrust equipment of the ship. Thus, even the skilled ship operator is accompanied with the fairly large mental and physical burden.

Therefore, to reduce the burden for the ship operator, for example, with respect to the control of the turn of ship, the apparatus constituting the closed loop as shown in FIG. 2 has been considered. Namely, an azimuth setting knob 10 is provided. The deviation $\psi_e$ between a set azimuth $\psi_i$ of the knob 10 and the bow azimuth $\psi$ of a hull 18 which is detected by a gyro compass 20 is obtained at an adding point 12. A pitch angle $P_0$ of the bow thrustor 16 is varied by a PID control unit 14 so as to completely eliminate the azimuth deviation $\psi_e$, thereby controlling the thrust $T_b$.

However, in such a conventional turn control apparatus, another azimuth setting knob is needed to control the turn of ship in addition to the operating levers to move the ship forwardly, backwardly, obliquely, and the like. On the other hand, this apparatus intends to merely turn the ship by the bow thrustor so that the bow is simply directed to the set azimuth. Therefore, it is impossible to perform the peculiar turn control such as to turn the ship near the oil digging rig without changing the position of the ship, which control is required in working ships such as anchor handling tag supply vessels. Further, there is also the problem such that the turning velocity cannot be freely changed.

SUMMARY OF THE INVENTION

It is an object of the present invention to provide an apparatus for controlling the turn of a ship having at least a bow thrustor for generating the leftward or rightward thrust on the side of the bow and a main propeller for generating the forward or backward thrust, in which the ship can be turned around the stern as a rotational center by the automatic control by the simple operation with the position of the hull held.

Another object of the invention is to provide an apparatus for controlling the turn of a ship in which only one joystick lever is equipped as operating means and the turn of ship can be controlled around the stern as a rotational center by operating the joystick lever with the position of the hull held.

Still another object of the invention is to provide an apparatus for controlling the turn of a ship in which an angular velocity control loop (PI control loop) is constituted by a set turning angular velocity $\dot\psi_i$ which is set by an amount of operation of a joystick lever and a turning angular velocity $\dot\psi$ of the hull which is derived by differentiating a bow azimuth $\psi$ from a gyro compass, the thrust which is generated from the bow thrustor is controlled, the ship is turned at the velocity proportional to the operation amounts in the rightward and leftward directions of the joystick lever, and further since the forward thrust occurs in the ship due to the control of a bow thrustor, main propellers are driven to generate the backward thrust proportional to the absolute value $|\dot\psi|$ of the turning angular velocity $\dot\psi$, and thereby allowing the ship to be turned around the stern as a rotational center with the position of the hull held.

The above and other objects, features, and advantages of the present invention will become more apparent from the following detailed description in conjunction with the accompanying drawings.

DETAILED DESCRIPTION OF THE PREFERRED EMBODIMENTS

Figure 1:
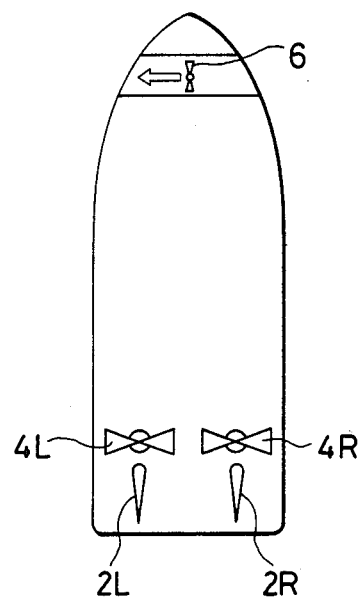
FIG. 1 is an explanatory diagram of a working ship having two rudders, two variable pitch propellers, and one bow thrustor.
Figure 2:
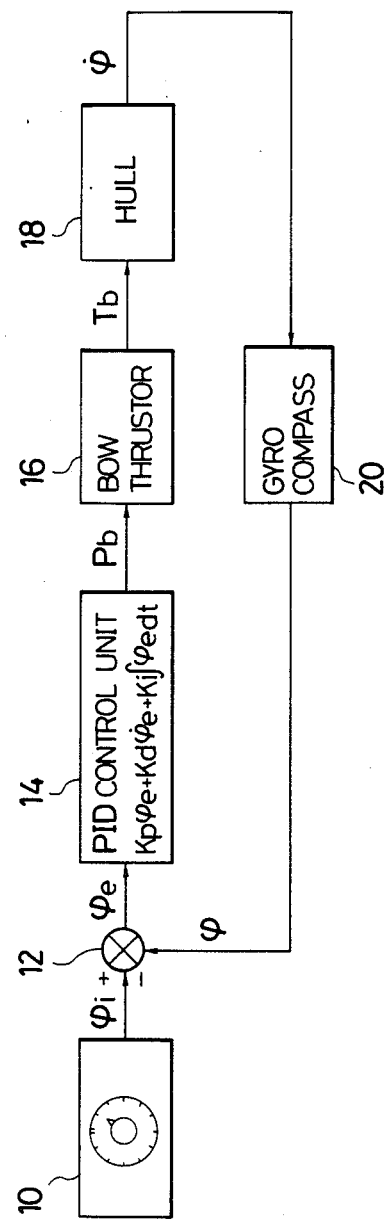
FIG. 2 is a block diagram showing a conventional turn control apparatus.
Figure 3:
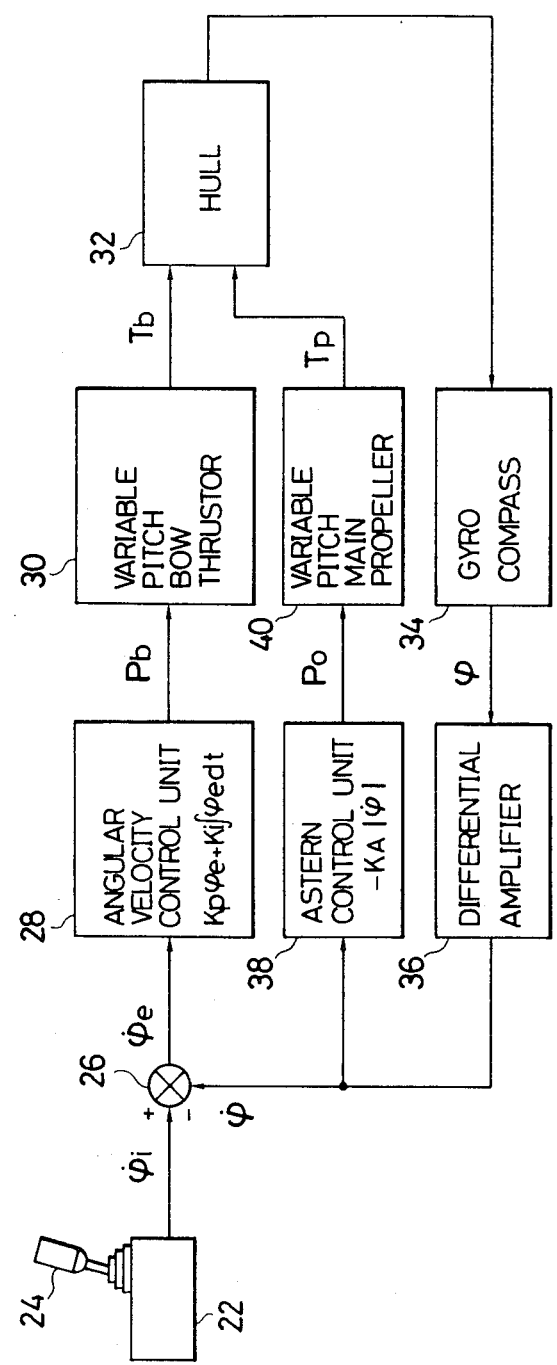
FIG. 3 is a block diagram showing an embodiment of the present invention.

FIG. 3 is a block diagram showing an embodiment of the present invention. The embodiment is applied to a ship having a bow thrustor to adjust the thrust by varying a pitch angle and a main propeller to similarly adjust the thrust by varying a pitch angle.

A constitution will now be described. A joystick input apparatus 22 has a joystick lever 24. When the lever 24 is inclined to the right, a set turning angular velocity $\dot\psi_i$ (for example, positive voltage which is proportional to an angle of inclination) to turn the ship to the right is output. Contrarily, when the lever 24 is inclined to the left, a set turning angular velocity $\dot\psi_i$ (for example, negative voltage which is proportional to an angle of inclination) to turn the ship to the left is output.

Namely, the joystick input apparatus 22 functions as the turning angular velocity setting means for setting the turning angular velocity $\dot{\psi}_i$ in accordance with the amount of operation of the joystick lever 24.

The set turning angular velocity $\dot{\psi}_i$ from the input apparatus 22 is supplied to an adding point 26. The bow azimuth $\psi$ of a hull 32 which is detected by a gyro compass 34, is differentiated by a differential amplifier 36 to obtain the turning angular velocity $\dot{\psi}$ of the hull 32. The turning angular velocity $\dot{\psi}$ is also supplied to the adding point 26. The turning angular velocity deviation $\dot{\psi}$ which is derived as the deviation between $\dot{\psi}_i$ and $\dot{\psi}$ is output to an angular velocity control unit 28.

The angular velocity control unit 28 performs the proportional integration control based on the input of, for example, the turning angular velocity deviation $\dot{\psi}_e$ and outputs a bow thrustor pitch command $P_b$ to a variable pitch bow thrustor 30. In response to the bow thrustor pitch command $P_b$, the pitch angle of the variable pitch bow thrustor 30 is controlled, thereby allowing the bow thrustor thrust $T_b$ corresponding to the pitch angle to act on the hull 32.

According to such a closed loop for the angular velocity control by the set turning angular velocity $\dot{\psi}_i$ from the joystick input apparatus 22 and the turning angular velocity $\dot{\psi}$ of the hull which is obtained from the differential amplifier 36, the hull can be turned at the turning angular velocity proportional to the operation amount of the joystick lever 24.

An astern control unit 38 controls variable pitch main propellers 40 to generate the backward thrust. The astern control unit 38 receives the turning angular velocity $\dot{\psi}$ of the hull 32 derived from the differential amplifier 36 and outputs a main propeller pitch command $P_0$ to obtain the backward thrust $T_p$ proportional to the absolute value $|\dot{\psi}|$ of the turning angular velocity to the variable pitch main propellers 40. By generating the backward thrust $T_p$ from the main propellers 40, the forward thrust to the hull 32 which was generated as the result of the thrust control of the bow thrustor 30 is set off.

The operation of the embodiment of FIG. 3 will now be described.

Figure 4:
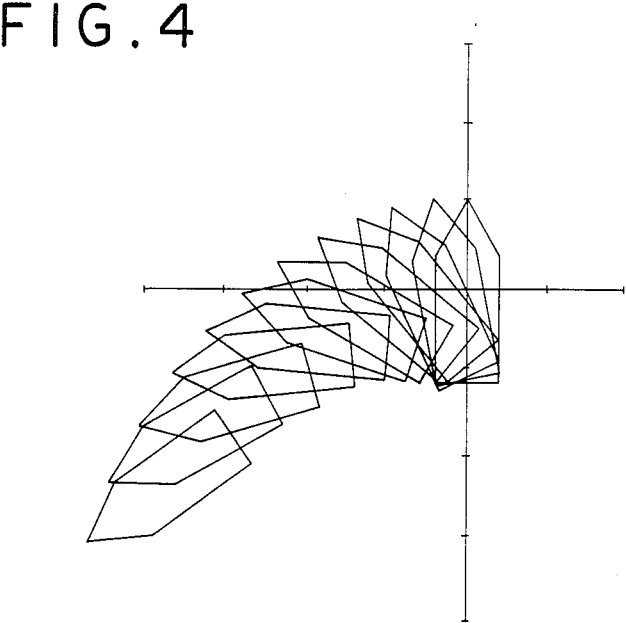
FIG. 4 is a turn simulation diagram when only the angular velocity of the bow thrustor is controlled in the embodiment of FIG. 3.

FIG. 4 shows the motion of the ship when the turn simulation is performed by use of only the angular velocity control loop without executing the backward control by the astern control unit 38 in the embodiment of FIG. 3. As will be obvious from this turn simulation, when the angular velocity control of the bow thrustor thrust was carried out by giving the set turning angular velocity for the left turn by the joystick lever 24, the ship is turned to the left while advancing forwardly. The reasons why the ship is turned to the left while advancing forwardly by the angular velocity control of the bow thrustor will be described hereinbelow.

Figure 5:
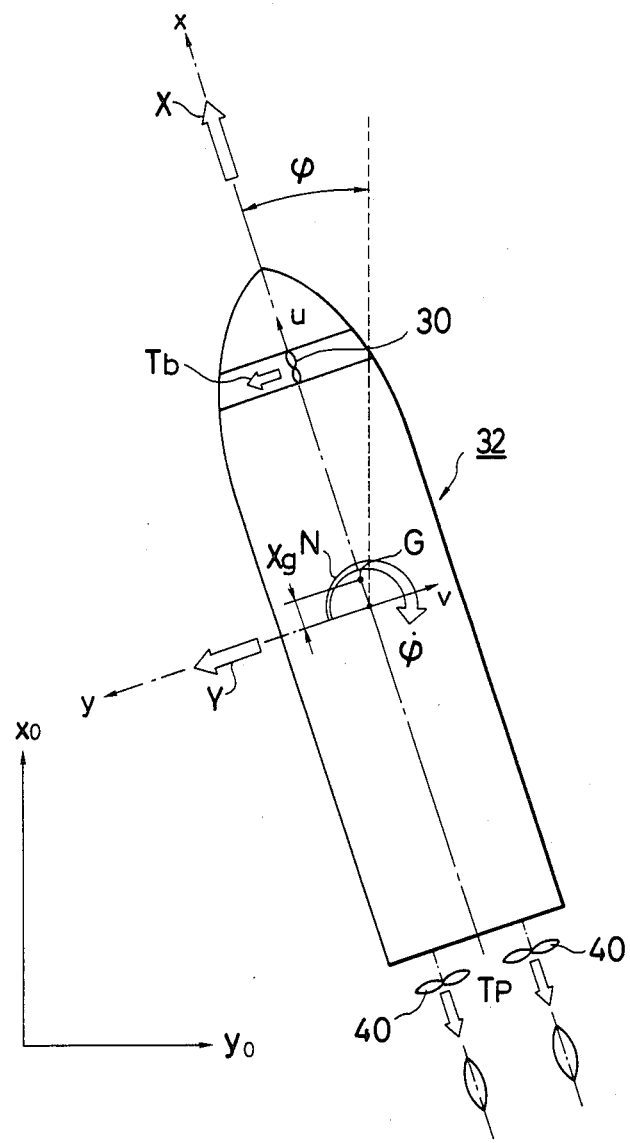
FIG. 5 is a coordinate diagram for explaining the motion of the hull.

FIG. 5 is an explanatory diagram to obtain equations of motion of the ship when it is assumed that the origin of the fixed coordinates x and y of the hull is located at the center of the hull 32. It is now assumed that $x_0$ and $y_0$ are the static coordinate system, the force which acts in the direction of an x axis of the hull 32 is X, the force which acts in the direction of a y axis of the hull 32 is Y, and the moment which acts around a z axis of the hull 32 is N. In this case, the equations of motion of the ship are given by the following expressions.

$$m(\dot{u} - vr - xgr^2) = X \tag{1}$$

$$m(\dot{v} + ur + xgr^2) = Y \tag{2}$$

$$(I_{zz} + mxg^2)\dot{r} + mxg(\dot{v} + ur) = N \tag{3}$$

where, xg denotes the x coordinate of the position of the center of gravity of the ship when the center of the hull is the origin of the coordinates, and $I_{zz}$ is the inertia moment around the z axis.

An attention is now paid to expression (1). Assuming that the ship is turned by applying the thrust $T_b$ by the bow thrustor 30, the force in the lateral direction by the bow thrustor 30 is given in Y in expression (2) and a drift velocity v is caused. In addition, the turning moment around the z axis is caused by the bow thrustor in N in expression (3), so that a turning angular velocity r is produced.

When the hull 32 is turned while drifting on the basis of the thrust $T_b$ of the bow thrustor 30, the initial value of X is zero and the term of vr (inertial term) shown in expression (1) is dominant. Therefore, by shifting the inertial term vr in expression (1) to the right side, we have $$m(\dot{u} - xgr^2) = X + mvr \tag{4}$$

and vr is larger than 0. Thus, a large forward thrust acts on the ship due to this inertial term.

Therefore, as shown in FIG. 4, due to only the angular velocity control of the bow thrustor, the ship is turned while advancing forwardly.

To set off the inertial term mvr in expression (4), the backward thrust $T_p$ is given by the two main propellers 40, thereby preventing the ship from forwardly advancing and allowing the hull to be turned around the stern as a rotational center. Namely, due to the generation of the backward thrust $T_p$, expression (4) can be expressed as follows.

$$m(\dot{u} - xgr^2) = X + mvr - T_p \tag{5}$$

Therefore, the hull can be turned around the stern as a rotational center with the position of the hull held by the backward thrust $T_p$ adapted to extinguish the forward thrust mvr.

The main propeller pitch angle command $P_0$ of the variable pitch main propellers 40 by the astern control unit 38 to obtain the backward thrust $T_p$ adapted to set off the forward thrust which is generated due to the angular velocity control by the bow thrustor 30 is $$P_0 = -K_a|vr|$$

which is proportional to vr in expression (5).

However, since it is actually difficult to detect the drift velocity v, it may be considered that v is smaller than r, namely, $v < \dot{\psi}$ in the turning motion. The control to generate the backward thrust is executed such that, for example, $$P_0 = -K_a|\dot{\psi}|$$

Figure 6:
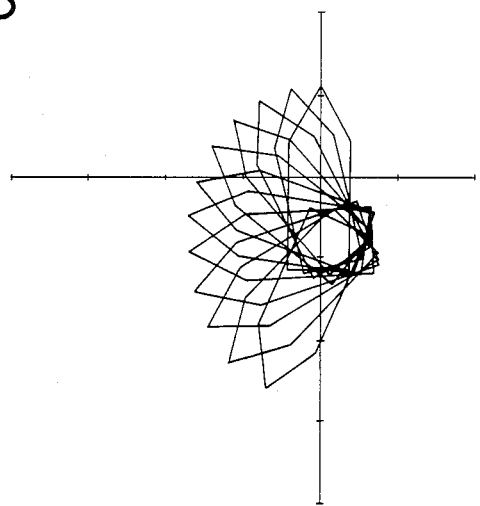
FIG. 6 is a turn simulation diagram according to the embodiment of FIG. 3.

FIG. 6 shows a turn simulation in the case where the backward thrust proportional to the turning angular velocity $|\dot{\psi}|$ was applied by the astern control unit 38 as mentioned above. The ship is turned around the stern as a rotational center with the position of the hull held.

Figure 7:
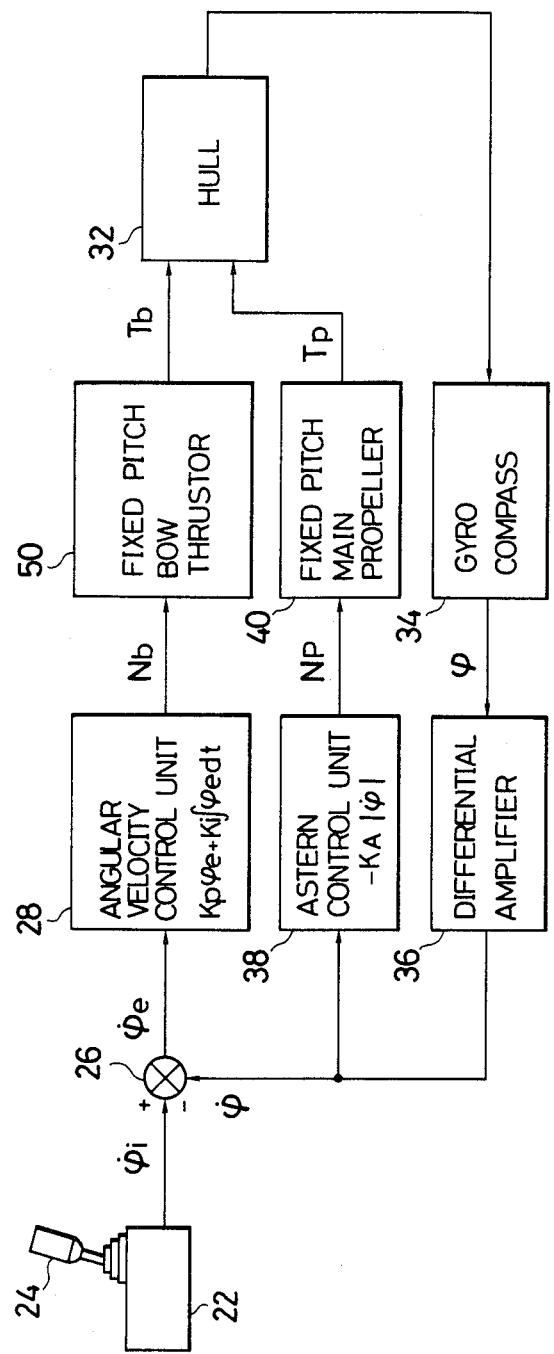
FIG. 7 is a block diagram showing another embodiment of the invention.

FIG. 7 is a block diagram showing another embodiment of the present invention. This embodiment is applied to the ship having a bow thrustor 50 of a fixed pitch and main propellers 42 of a fixed pitch.

In FIG. 7, the angular velocity control unit 28 receives the turning angular velocity deviation $\dot{\psi}_e$ from the adding point 26 and performs the proportional integration control. The control unit 28 then gives a bow thrustor rotating speed command $N_b$ to the bow thrustor 50, thereby allowing the bow thrustor thrust $T_b$ for control of the hull to be generated. On the other hand, the astern control unit 38 to generate the control output proportional to the absolute value $|\dot{\psi}|$ of the turning angular velocity gives the main propeller rotating speed command $N_p$ to the fixed pitch main propellers 42, thereby allowing the backward thrust $T_b$ proportional to $|\dot{\psi}|$ to be generated due to the rotating speed control.

The other constitution is the same as that in the embodiment shown in FIG. 3.

As described above, even when the bow thrustor and main propellers of the fixed pitches are used, the rotating speed control of the fixed pitch bow thrustor 50 is performed by the angular velocity control unit 28 and the rotating speed control of the fixed pitch main propellers 42 is executed by the astern control unit 38. The backward thrust $T_p$ is generated to set off the forward thrust which is generated when the ship is turned while drifting. Thus, the ship can be turned around the stern as a rotational center with the position of the hull held.

In the foregoing two embodiments, the invention has been applied to the ship having two rudders, two propellers, and one bow thrustor as an example. However, the invention can be also similarly applied to the ship having one rudder, one propeller, one bow thrustor, and one stern thrustor. In other words, the turning control of the present invention can be applied as it is to other ships having at least a bow thrustor for generating the thrust in the lateral direction of the bow and a main propeller for generating the thrust in the forward/backward direction.

As described above, according to the invention, by operating the joystick lever which is used as an input apparatus to move the ship forwardly, backwardly, or obliquely, the turning speed of the ship can be freely changed on the basis of the operation amount of the joystick lever. In addition, by use of the angular velocity control loop for the thrust control of the bow thrustor, the turning speed of the ship can be held constant. Further, by applying the backward thrust proportional to the turning speed, the forward thrust based on the inertia force which is caused when the ship is turned while drifting can be set off and the ship can be turned around the stern as a rotational center at the position of the specific point at sea. Therefore, the loading and unloading works of cargoes can be extremely easily performed. Further, the invention is fairly useful when the ship leaves the shore.

For the switching between the control of the forward, backward, or oblique motion of the ship and the turning control, a switch or the like may be attached at the head of the joystick lever and, in this case, if those controls are alternately switched each time the switch is depressed, the operating efficiency will be further improved.

What is claimed is:

1. An apparatus for controlling the turn of a ship having at least a bow thruster which is attached on the bow and generates a thrust in lateral direction and a main propeller which is attached on the side of the stern and generates a thrust in the forward or backward direction, in which the ship is turned around the stern as a rotational center with the position of the hull held at a fixed point without forwardly or backwardly moving, said apparatus comprising:
setting means for setting a turning angular velocity in accordance with an amount of operation of said setting means;
turning angular velocity control means for controlling the thrust which is generated from said bow thruster, said turning angular velocity control means being part of the closed loop which also has in it a representation of the setting means and an indication of
astern control means for controlling said main propeller so as to generate the backward thrust proportional to the absolute value of said turning angular velocity of the hull.

2. A control apparatus according to claim 1, wherein said setting means has one joystick lever and is provided with means for outputting a setting signal to set the turning angular velocity to a magnitude corresponding to an angle of inclination of said joystick lever in order to command the right turn by inclining said joystick lever to the right, and for outputting a setting signal to set the turning angular velocity to a magnitude corresponding to an angle of inclination of said joystick lever in order to command the left turn by inclining the joystick lever to the left.

3. A control apparatus according to claim 1, wherein said turning angular velocity control means has means for controlling a pitch angle of a variable pitch bow thrustor so as to completely eliminate the deviation between the set turning angular velocity which is set by said setting means and the turning angular velocity of the hull.

4. A control apparatus according to claim 1, wherein said turning angular velocity control means has means for controlling a rotating speed of a fixed pitch bow thrustor so as to completely eliminate the deviation between the set turning angular velocity which is set by said setting means and the turning angular velocity of the hull.

5. A control apparatus according to claim 1, wherein said astern control means has means for controlling a pitch angle of a variable pitch propeller so as to generate the backward thrust proportional to the absolute value of the turning angular velocity of the hull.

6. A control apparatus according to claim 1, wherein said astern control means has means for controlling a rotating speed of a fixed pitch propeller so as to generate the backward thrust proportional to the absolute value of the turning angular velocity of the hull.

* * * * *